United States Patent
Sridhar et al.

(10) Patent No.: US 10,783,375 B2
(45) Date of Patent: Sep. 22, 2020

(54) SYSTEM AND METHOD FOR GROUPING INDEPENDENT MACHINE LEARNT ARTIFICIAL INTELLIGENCE TO GENERATE COLLECTIVE "MACHINE WISDOM" TO OBTAIN HIGHER ACCURACY IN IDENTIFICATION OF TAGS, OBJECTS AND ACTIONS IN A VIDEO

(71) Applicant: Apptarix Mobility Solutions Pvt Ltd, Karnataka (IN)

(72) Inventors: Muralidhar Kolar Sridhar, Bangalore (IN); Adrish Bera, Bangalore Karnataka (IN)

(73) Assignee: APPTARIX MOBILITY SOLUTIONS PVT LTD, Karnataka (IN)

( * ) Notice: Subject to any disclaimer, the term of this patent is extended or adjusted under 35 U.S.C. 154(b) by 56 days.

(21) Appl. No.: 16/102,352

(22) Filed: Aug. 13, 2018

(65) Prior Publication Data

US 2019/0347484 A1 Nov. 14, 2019

(30) Foreign Application Priority Data

May 10, 2018 (IN) .............................. 201841017574

(51) Int. Cl.
  *G06K 9/00* (2006.01)
  *G06K 9/62* (2006.01)
  *G06N 5/04* (2006.01)
  *G06N 20/00* (2019.01)

(52) U.S. Cl.
  CPC ..... *G06K 9/00718* (2013.01); *G06K 9/00228* (2013.01); *G06K 9/00751* (2013.01); *G06K 9/6262* (2013.01); *G06N 5/043* (2013.01); *G06N 20/00* (2019.01); *G06K 2209/01* (2013.01)

(58) Field of Classification Search
  CPC .................. G06K 9/00718; G06K 9/6262
  See application file for complete search history.

(56) References Cited

U.S. PATENT DOCUMENTS

| 2015/0058998 A1* | 2/2015 | Yu ........................... G06F 21/10 726/26 |
| 2019/0138833 A1* | 5/2019 | Xiong .................. G06K 9/3233 |
| 2019/0147864 A1* | 5/2019 | Lu ........................... G10L 25/54 704/275 |
| 2019/0160339 A1* | 5/2019 | Zhang ................ G06K 9/00342 |

* cited by examiner

*Primary Examiner* — John J Lee
(74) *Attorney, Agent, or Firm* — Steven M. Koehler; Westman, Champlin & Koehler, P.A.

(57) ABSTRACT

A system and method for grouping independent machine learnt artificial intelligence to generate collective "machine wisdom" to obtain higher accuracy in identification of tags, objects and actions in a video includes an input module, Media Asset Management (MAM) module, catalogue module and a machine learning module. The input module allows the user to upload one or more videos into a media Enterprise Resource Planning (ERP) solution, a media asset management solution, or an Over-the-Top (OTT) Video Content Management System (CMS). The system further predicts and improves the vision parameters by using collective artificial intelligence machines through mutual learnt models and thereby enables higher accurate video identification resolution and cataloguing of a problem or its prediction in lesser period of time.

1 Claim, 2 Drawing Sheets

SYSTEM AND METHOD FOR GROUPING INDEPENDENT MACHINE LEARNT ARTIFICIAL INTELLIGENCE TO GENERATE COLLECTIVE "MACHINE WISDOM" TO OBTAIN HIGHER ACCURACY IN IDENTIFICATION OF TAGS, OBJECTS AND ACTIONS IN A VIDEO

TECHNICAL FIELD OF THE INVENTION

The present invention relates to a system and method to provide a higher accuracy video identification and cataloguing by grouping independent machine learnt models of artificial intelligence machine.

BACKGROUND OF THE INVENTION

Machine learning artificial intelligence is derived from a constant feedback of supervised training information and feature resolution data. Artificial intelligence and machine learning are used in various fields including media applications like computer vision, sentiment analysis, automatic cataloguing, etc. Artificial intelligence engines are available to solve the problems with varying accuracy and varying applicability for different needs. Artificial intelligence machines provide higher accuracy video identification and cataloguing by identifying speech, text, brands, some on logos, some on emotions and some on face identification therein.

Various types of conventional methods and systems that provide high accuracy videos are known in the prior art. Conventional systems do not use collective artificial intelligence machines to enable higher accurate video identification and cataloguing. Conventional systems provide reasonable accuracy video identification by leaving behind the inaccuracies of the models learnt by the artificial intelligence machine. Conventional systems provide lower accurate video identification by consuming more time.

Hence, there is a need for system and method to provide a higher accuracy in identification of tags, objects and actions in a video by grouping independent machine learnt models of artificial intelligence machine.

SUMMARY OF THE INVENTION

The present invention overcomes the drawbacks in the prior art and provides a system and method for grouping independent machine learnt artificial intelligence to generate collective "machine wisdom" to obtain higher accuracy in identification of tags, objects and actions in a video.

The system comprises an input module that allows the user(s) to upload one or more videos into a media Enterprise Resource Planning (ERP) solution a media asset management solution or an Over-the-Top (OTT) Video Content Management System (CMS). A Media Asset Management (MAM) module is configured to receive one or more videos from the input module. Further, a catalogue module is configured to break a plurality of parameters in the video. The parameters include text, images/video scenes, events, brands, files, products, faces and daylight.

In an embodiment, a machine learning module is configured to group a machine learnt model of artificial intelligence machine into a plurality of artificial intelligence machines. Each artificial intelligence machines receives at least one parameters in the video from the catalogue module. The artificial intelligence machines include a first artificial intelligence machine, a second artificial intelligence machine, a third artificial intelligence machine, a fourth artificial intelligence machine and a fifth intelligence machine. The first artificial intelligence machine receives and identifies the text in the broken video. The second artificial intelligence machine detects and identifies faces from an open web data in the broken scenes of the video. The third artificial intelligence machine jointly identifies brands and products characteristics in the broken scene. The fourth artificial intelligence machine identifies speech in the video and further identifies the sentiment based on the text and speech using a OCR and a sentiment analysis and thereby achieves and provides a higher accuracy video identification and cataloguing at lesser period of time. The fifth artificial intelligence machine receives and identifies actions in the broken scene of the video.

In another embodiment of the invention, a custom model is communicatively coupled to the plurality of artificial intelligence machines. The custom model collectively learns and predicts from historical data of the plurality of artificial intelligence machines to identify one or more video parameters using machine learning engine without assistance of the artificial intelligence machines.

A unionization and a summarization module receive the data from the machine learning engine. The unionization module is configured to unite different video parameters. The summarization module is configured to sum the video from the multiple time interval.

Yet another embodiment of the invention, a cloud-based database server is configured to store the plurality of videos and video parameters. Further, a search engine is configured to search different videos and video parameters in the database. The user terminal is configured to input user parameters and display desired output.

Further, the plurality of artificial intelligence machines is configured to learn from each other to reduce cost over a period of time. The present invention provides a system and method, which is simple and is suitable for the applications in all kinds of media and advertising companies.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention overcomes the drawbacks of the technology models available in the state of the art by providing a system and method for grouping independent machine learnt artificial intelligence to generate collective "machine wisdom" to obtain higher accuracy in identification of tags, objects and actions in a video. The system comprises an input module, Media Asset Management (MAM) module, catalogue module and a machine learning module. The input module allows the user(s) to upload one or more videos into a media ERP solution, a media asset management solution. The system further predicts and improves the vision parameters by using collective artificial intelligence machines through mutual learnt models and thereby enables higher accurate video identification resolution and cataloguing of a problem or its prediction in lesser period of time.

Figure 1:
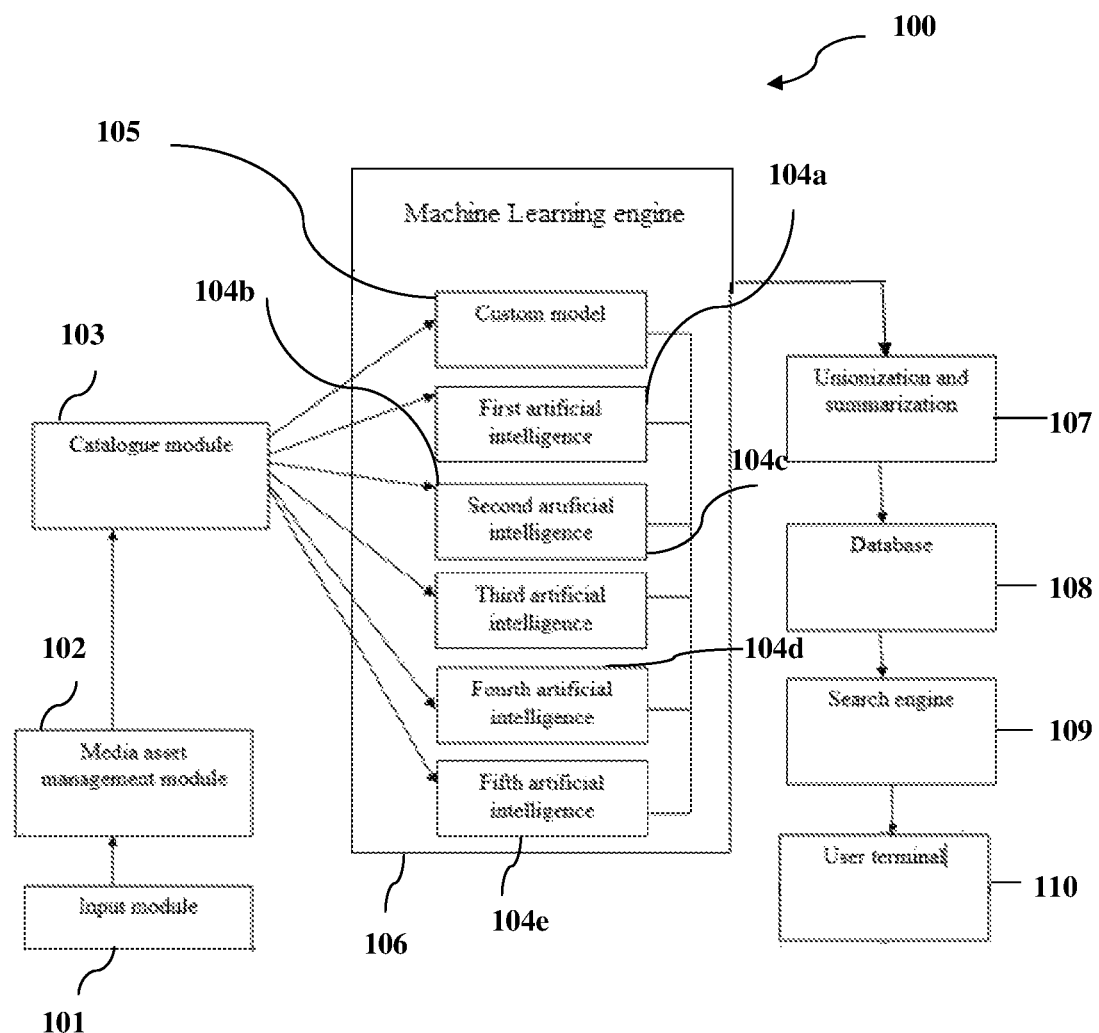
FIG. 1 shows a block diagram of a system for grouping independent machine learnt artificial intelligence to generate collective "machine wisdom" to obtain higher accuracy in identification of tags, objects and actions in a video, according to one embodiment of the invention.

FIG. 1 illustrates a block diagram of a system for grouping independent machine learnt artificial intelligence to generate collective "machine wisdom" to obtain higher accuracy in identification of tags, objects and actions in a video, according to one embodiment of the invention. In a preferred embodiment, the system comprises an input module and a machine learning module. The input module (101) allows the user(s) to upload one or more videos into a media ERP solution a media asset management solution or an Over-the-Top (OTT) Video CMS.

A Media Asset Management (MAM) module (102) is configured to receive one or more videos from the input module. Further, MAM module (102) transmits one or more videos to the catalogue module (103).

The catalogue module (103) is configured to break the plurality of parameters in the video. The one or more parameters include text, images/video scenes, events, brands, files, products, faces and daylight.

A machine learning module groups a machine learnt model of artificial intelligence machine into a plurality of artificial intelligence machines (104a, 104b, 104c, 104d and 104e). Each of the artificial intelligence machine (104a, 104b, 104c, 104d and 104e) receives at least one parameters in the video from the catalogue module. The artificial intelligence machines (104a, 104b, 104c and 104d) include a first artificial intelligence machine (104a), a second artificial intelligence machine (104b), a third artificial intelligence machine (104c), a fourth artificial intelligence machine (104d) and fifth intelligence module (104e). It is understood that the artificial intelligence machines may be added depending upon the number of video parameters.

The plurality of artificial intelligence machines (104a, 104b, 104c, 104d and 104e) may identify a plurality of parameters in the video. The parameters of the video may include but not limited to, faces, events, brands, products, texts, daylight, etc.

The artificial intelligence machines (104a, 104b, 104c, 104d and 104e) include a first artificial intelligence machine (104a), a second artificial intelligence machine (104b), a third artificial intelligence machine (104c), a fourth artificial intelligence machine (104d) and a fifth intelligence machine (105e). The first artificial intelligence machine (104a) identifies the text from the uploaded videos. The second artificial intelligence machine (104b) detects and identifies faces from an open web data in the broken scenes of the video. The third artificial intelligence machine (104c) jointly identifies brands and products characteristics in the broken scene. The fourth artificial intelligence machine (104d) identifies speech in the video and further identifies the sentiment based on the text and speech using an OCR and a sentiment analysis and thereby achieves and provides a higher accuracy video identification and cataloguing at lesser period. Further, the fifth artificial intelligence machine (104e) receives and identifies actions in the broken scene of the video.

In an embodiment, a custom model (105) is communicatively coupled to the plurality of artificial intelligence machines (104a, 104b, 104c, 104d, 104e). The custom model (105) collectively learns from the historical stored data of the plurality of artificial intelligence machines to identify one or more video parameters using machine learning engine, without assistance of the plurality artificial intelligence machines (104a, 104b, 104c, 104d, 104e). Further, the plurality of artificial intelligence modules (104a, 104b, 104c, 104d, 104e) may also train the custom model (105).

Further, a unionization and summarization module (107) receives input from the machine learning engine (106). A unionization module is configured to unite different video parameters. The summarization module is configured to sum the parameters of the video from the multiple time interval.

A cloud-based database server (108) is configured to store the plurality of videos and video parameters. The search engine (109) searches different videos and video parameters in the database (108). The user terminal (110) at the user end is configured to input user parameters to display desired output.

In an embodiment of the invention, the system (100) further uses a process module (not shown) to improve the accuracy of the processed video identification and cataloguing when the video parameters were not accurate enough.

The system (100) further predicts and improves the vision parameters by using collective artificial intelligence machines (104a, 104b, 104c, 104d and 104e) through mutual learning and thereby enables higher accurate video identification and cataloguing resolution of a problem or its prediction.

In an alternate embodiment of the invention, the plurality of artificial intelligence machines (104a, 104b, 104c, 104d, 104e) are further configured to learn from each other to reduce cost over a period of time. It is understood that the mutual learning has been outlined to be about higher accuracy, while learning from one machine to another machine results in cost savings over a period of time.

Figure 2:
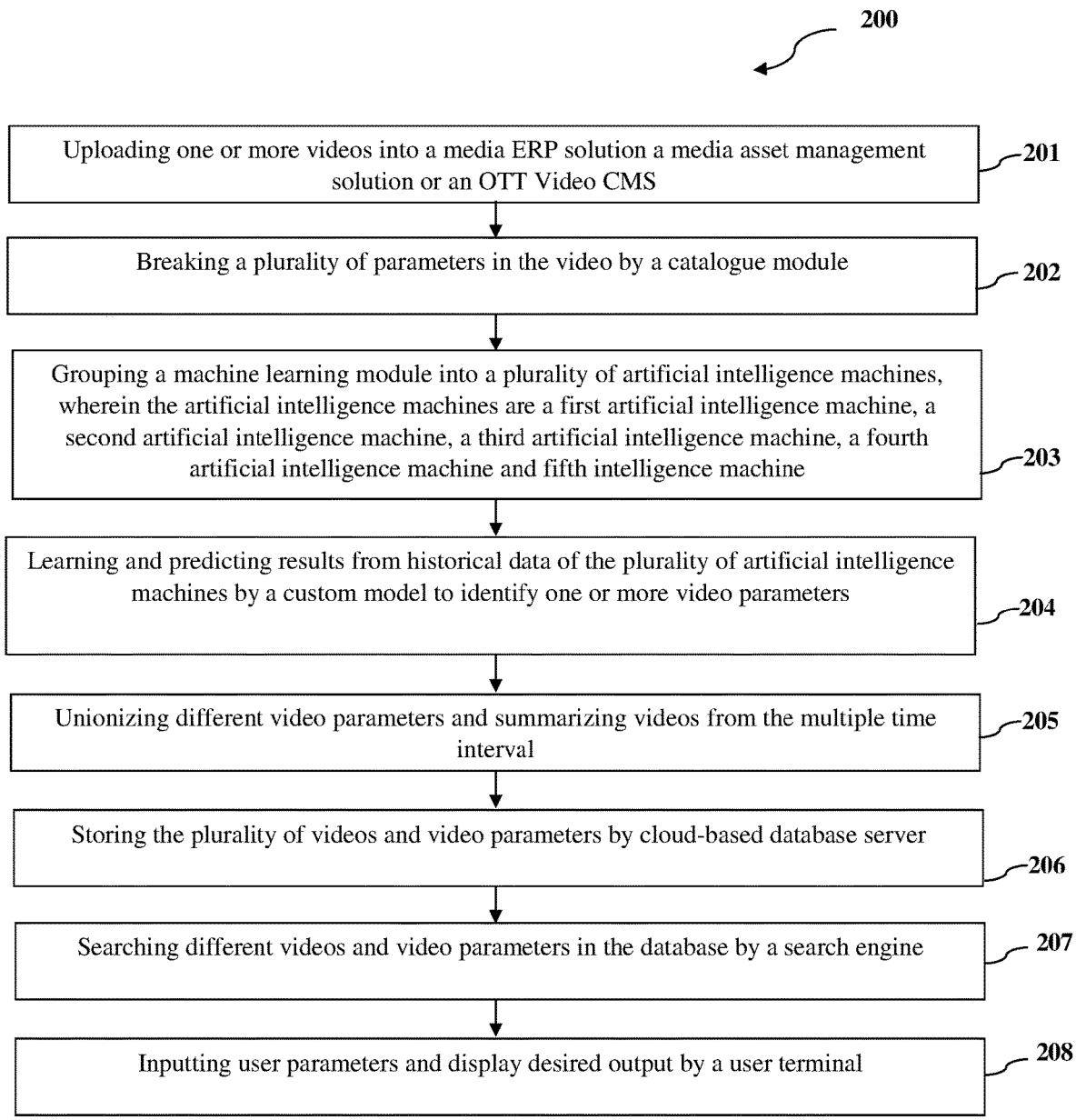
FIG. 2 illustrates the steps involved in grouping independent machine learnt artificial intelligence to generate collective "machine wisdom" to obtain higher accuracy in identification of tags, objects and actions in a video, according to one embodiment of the invention.

FIG. 2 illustrates the steps involved in grouping independent machine learnt artificial intelligence to generate collective "machine wisdom" to obtain higher accuracy in identification of tags, objects and actions in a video, according to one embodiment of the invention. In a preferred embodiment, the method includes the steps of uploading one or more videos into a media ERP (Enterprise Resource Planning) solution a media asset management solution or an Over-the-Top (OTT) Video CMS, at step 201.

At step 202, a plurality of parameters in the video are broken by a catalogue module (103). The video parameters include text, images/video scenes, events, brands, files, products, faces and daylight.

At step 203, a machine learnt model of artificial intelligence machine is grouped into a plurality of artificial intelligence machines (104a, 104b, 104c and 104d, 104e). The artificial intelligence machines include a first artificial intelligence machine (104a), a second artificial intelligence machine (104b), a third artificial intelligence machine (104c), fourth artificial intelligence machine (104d) and fifth artificial intelligence machine (104e). The first artificial intelligence machine (104a) receives and identifies the text from the broken video. The second artificial intelligence machine (104b) detects and identifies faces from an open web data in the broken scenes of the video. The third artificial intelligence machine (104c) jointly identifies brands and products characteristics in the broken scene. The fourth artificial intelligence machine (104d) identifies speech in the video and further identifies the sentiment based on the text and speech using a OCR and a sentiment analysis and thereby achieves and provides a higher accuracy video identification and cataloguing at lesser period of time. The fifth artificial intelligence machine (104e) receives and identifies actions in the broken scene of the video.

At step 204, the custom model (105) collectively learns and predicts result from historical data of the plurality of artificial intelligence machines (104a, 104b, 104c, 104d and 104e) to identify one or more video parameters using machine learning engine without assistance of the artificial intelligence machines. At step 205, different video parameters which are taken from the multiple time interval are united and summarized. The plurality of videos and video parameters are stored in a cloud-based database server (108) at step 206.

At step 207, the different videos and video parameters are searched in the database (108) by a search engine (109). The desired output is displayed according to the user entered parameters at step 208.

Thus, the present invention provides a system and method, which is simple and is suitable for the applications in all kinds of media and advertising companies.

The description of the present system has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of grouping independent machine learnt artificial intelligence to generate collective "machine wisdom" to obtain higher accuracy in identification of tags, objects and actions in a video, the method comprising the steps of:

a. uploading one or more videos into a media Enterprise Resource Planning (ERP) solution, a media asset management solution, or an Over-the-Top (OTT) Video Content Management System (CMS);
b. breaking a plurality of parameters in the video by a catalogue module, wherein the parameters include text, images/video scenes, events, brands, files, products, faces and daylight;
c. grouping a machine learnt model of artificial intelligence machine into a plurality of artificial intelligence machines, wherein each artificial intelligence machine receives at least one parameters in the video from the catalogue module, wherein the plurality of artificial intelligence machines include a first artificial intelligence machine, a second artificial intelligence machine, a third artificial intelligence machine, a fourth artificial intelligence machine and a fifth intelligence machine, wherein the first artificial intelligence machine receives and identifies the text, wherein the second artificial intelligence machine detects and identifies faces from an open web data in broken scenes of the video, wherein the third artificial intelligence machine jointly identifies brands and products characteristics in the broken scene, wherein the fourth artificial intelligence machine identifies speech in the video and further identifies sentiment based on the text and speech using a OCR and a sentiment analysis and thereby achieves and provides a higher accuracy video identification and cataloguing at lesser period of time, wherein the fifth artificial intelligence machine receives and identifies actions in the broken scene of the video;
d. learning and predicting results from historical data of the plurality of artificial intelligence machines by a custom model to identify one or more video parameters using machine learning engine without assistance of the plurality of the artificial intelligence machines;
e. unionizing different video parameters and summarizing videos from multiple time interval;
f. storing the one or more videos and video parameters by cloud-based database server;
g. searching different videos and video parameters in the database by a search engine; and
h. inputting user parameters and display desired output by a user terminal.

\* \* \* \* \*